(12) United States Patent
Iwamoto

(10) Patent No.: US 12,405,456 B2
(45) Date of Patent: Sep. 2, 2025

(54) ZOOM LENS AND IMAGE PICKUP APPARATUS

(71) Applicant: CANON KABUSHIKI KAISHA, Tokyo (JP)

(72) Inventor: Shunji Iwamoto, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 18/353,139

(22) Filed: Jul. 17, 2023

(65) Prior Publication Data
US 2024/0053591 A1 Feb. 15, 2024

(30) Foreign Application Priority Data
Aug. 10, 2022 (JP) .................. 2022-128262

(51) Int. Cl.
G02B 15/14 (2006.01)
G02B 15/16 (2006.01)

(52) U.S. Cl.
CPC ......... *G02B 15/1461* (2019.08); *G02B 15/16* (2013.01)

(58) Field of Classification Search
CPC ... G02B 15/146; G02B 15/1461; G02B 15/16
USPC .......... 359/676, 683, 684, 694, 695
See application file for complete search history.

(56) References Cited

U.S. PATENT DOCUMENTS

| | | | |
|---|---|---|---|
| 9,217,851 B2 | 12/2015 | Iwamoto | |
| 10,078,202 B2 | 9/2018 | Iwamoto | |
| 10,416,421 B2 | 9/2019 | Iwamoto | |
| 10,663,703 B2 | 5/2020 | Iwamoto | |
| 10,754,169 B2 | 8/2020 | Iwamoto | |
| 11,131,829 B2 | 9/2021 | Iwamoto | |
| 11,181,717 B2 | 11/2021 | Iwamoto | |
| 2014/0055659 A1 | 2/2014 | Iwamoto | |
| 2014/0375844 A1* | 12/2014 | Matsumura | G02B 15/14 359/557 |
| 2015/0130969 A1* | 5/2015 | Nakamura | H04N 23/69 359/683 |
| 2015/0316755 A1* | 11/2015 | Takemoto | G02B 15/145113 359/683 |
| 2015/0362711 A1* | 12/2015 | Wakazono | H04N 23/72 348/360 |
| 2017/0108677 A1* | 4/2017 | Shimomura | G02B 15/20 |
| 2017/0336601 A1* | 11/2017 | Wei | G02B 13/009 |
| 2020/0271906 A1* | 8/2020 | Kimura | G02B 15/20 |

(Continued)

FOREIGN PATENT DOCUMENTS

| | | | | |
|---|---|---|---|---|
| JP | 2019211621 A | * | 12/2019 | G02B 13/009 |
| JP | 2020134807 A | * | 8/2020 | G02B 15/1461 |
| JP | 2021036275 A | * | 3/2021 | |

*Primary Examiner* — Bumsuk Won
*Assistant Examiner* — Alex Park Rickel
(74) *Attorney, Agent, or Firm* — Carter, DeLuca & Farrell LLP

(57) ABSTRACT

A zoom lens includes, in order from an object side to an image side, a first lens unit having positive refractive power, a second lens unit having negative refractive power, and a rear group including at least four lens units that move during zooming. Distances between adjacent lens units change during zooming. The first lens unit is fixed relative to an image plane during zooming and during focusing. The first lens unit includes at least three lenses having positive refractive powers. A predetermined condition is satisfied.

18 Claims, 11 Drawing Sheets

(56) References Cited

U.S. PATENT DOCUMENTS

| | | | |
|---|---|---|---|
| 2021/0199939 A1* | 7/2021 | Tabata | G02B 15/145113 |
| 2021/0396977 A1* | 12/2021 | Tanaka | G02B 15/1461 |
| 2022/0043243 A1 | 2/2022 | Iwamoto | |
| 2022/0236543 A1* | 7/2022 | Ikeda | G02B 15/145127 |
| 2023/0010047 A1 | 1/2023 | Iwamoto | |
| 2023/0266583 A1 | 8/2023 | Iwamoto | |
| 2023/0384570 A1 | 11/2023 | Iwamoto | |

* cited by examiner

ZOOM LENS AND IMAGE PICKUP APPARATUS

BACKGROUND

Technical Field

One of the aspects of the embodiments relates to a zoom lens and an image pickup apparatus.

Description of Related Art

A zoom lens in an image pickup apparatus is demanded to have a compact size, reduced weight, and high optical performance that satisfactorily corrects various aberrations such as chromatic aberration. The zoom lens is also demanded to have a short focal length at a wide-angle end, a large magnification variation ratio, a small F-number, and a large aperture ratio, and to be easily manufactured. The zoom lens is also demanded to have high-speed zoom operation. Japanese Patent Laid-Open No. 2020-134807 discloses a zoom lens that includes, in order from an object side to an image side, a lens unit having positive refractive power, a lens unit having negative refractive power, and a rear group having a plurality of lens units.

The zoom lens disclosed in Japanese Patent Laid-Open No. 2020-134807 has difficulty in realizing high image quality and high-speed zoom operation while having a compact size, a high magnification variation ratio, and a large aperture ratio.

SUMMARY

A zoom lens according to one aspect of the disclosure includes, in order from an object side to an image side, a first lens unit having positive refractive power, a second lens unit having negative refractive power, and a rear group including at least four lens units that move during zooming. Distances between adjacent lens units change during zooming. The first lens unit is fixed relative to an image plane during zooming and during focusing. The first lens unit includes at least three lenses having positive refractive powers. The following inequalities are satisfied:

$$7.50 < Lw/fw < 15.00$$

$$0.20 < T2/|f2| < 0.85$$

where Lw is a distance on an optical axis from a surface vertex position of a surface closest to an object in the zoom lens at a wide-angle end to the image plane, fw is a focal length of the zoom lens at the wide-angle end, T2 is a distance on the optical axis from a surface vertex position of a surface closest to the object of the second lens unit to a surface vertex position of a surface closest to the image plane of the second lens unit, and f2 is a focal length of the second lens unit. An image pickup apparatus having the above zoom lens also constitutes another aspect of the disclosure.

Further features of the disclosure will become apparent from the following description of embodiments with reference to the attached drawings.

DESCRIPTION OF THE EMBODIMENTS

Figure 1:
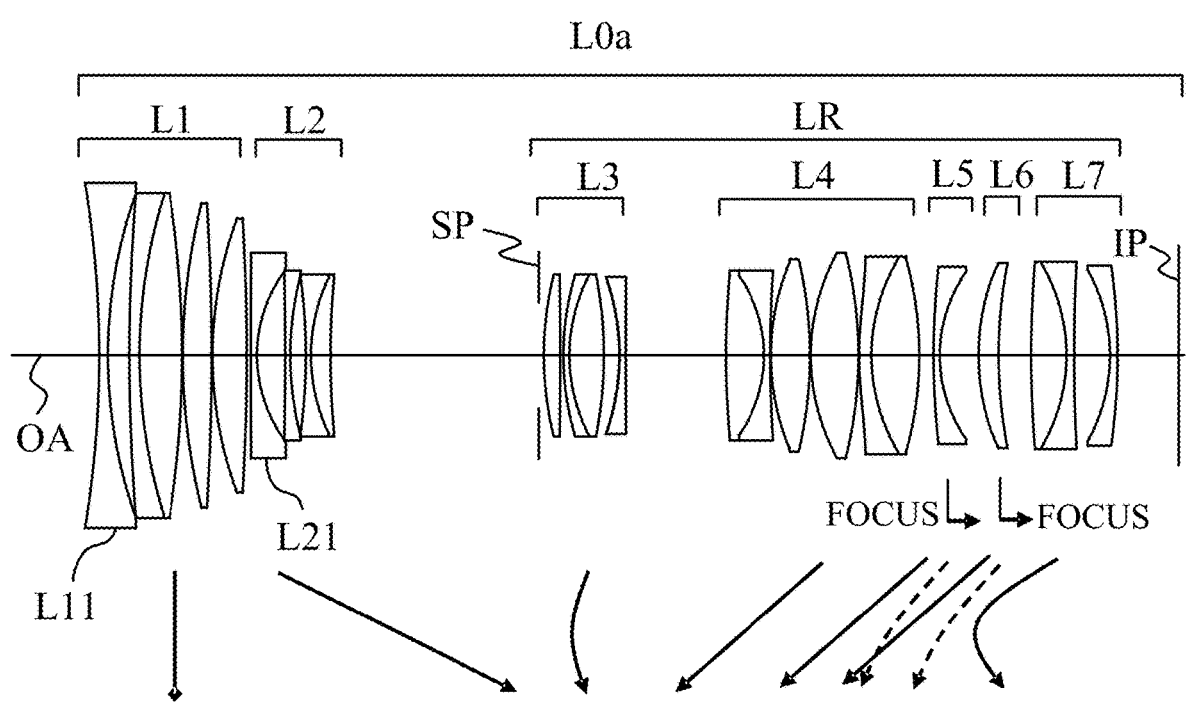
FIG. 1 is a sectional view of a zoom lens according to Example 1.

Referring now to the accompanying drawings, a detailed description will be given of embodiments according to the disclosure.

In order to achieve high-speed zooming, the mass and moving amount of the lens unit that moves during magnification variation (during zooming) may be reduced. In order to suppress the mass of the moving lens unit, the number of lenses in the moving lens unit may be reduced. However, the reduced number of lenses in the moving lens unit would have difficulty in correcting aberrations, and in achieving high image quality. A reduced moving amount of the moving lens unit has difficulty in achieving high magnification variation. In a case where the refractive power of the lens units in the zoom lens is increased in order to reduce the moving amount of the moving lens units, it becomes difficult to correct aberrations and to improve image quality. Therefore, in order to obtain a zoom lens that has a compact size, a high magnification variation ratio, and a large aperture ratio, and achieves high image quality and high-speed zoom operation, it is important to properly set the arrangement of the lenses and lens units in the zoom lens.

The zoom lens according to each example includes a plurality of lens units. The lens units consist of, in order from the object side to the image side, a first lens unit L1 having positive refractive power, a second lens unit L2 having negative refractive power, and a rear group LR that includes at least four lens units configured to move during zooming. Distances between adjacent lens units (air spacings in the direction along the optical axis OA) change during zooming. The first lens unit L1 does not move (or is fixed) relative to the image plane during zooming and during focusing. Since a zoom lens with a high magnification variation ratio and a large aperture ratio tends to have a large front lens diameter and a large mass, fixing the first lens unit L1 relative to the image plane can easily realize high-speed zoom operations. In a case where the plurality of lens units are moved while the distances change between them, various aberrations during zooming, in particular zoom fluctuations of lateral chromatic aberration and astigmatism, can be well corrected.

The following inequalities (1) and (2) are satisfied in the zoom lens according to each example:

$$7.50 < Lw/Fw < 15.00 \quad (1)$$

$$0.20 < T2/|f2| < 0.85 \quad (2)$$

Here, Lw is a distance on the optical axis from a surface vertex position of a surface closest to the object of the zoom lens at the wide-angle end to the image plane. fw is a focal length of the zoom lens (entire system) at the wide-angle end. T2 is a distance on the optical axis from a surface vertex position of a surface closest to the object to a surface vertex position of a surface closest in the second lens unit L2 to the image plane. f2 is a focal length of the second lens unit L2.

Inequality (1) defines a relationship between the distance on the optical axis from the surface vertex position of the surface closest to the object of the zoom lens at the wide-angle end to the image plane and the focal length of the zoom lens (entire system) at the wide-angle end. In a case where the value Lw/fw becomes higher than the upper limit of inequality (1), the lens diameter and mass of the second lens unit L2 increase and it becomes difficult to achieve high-speed zoom operations. On the other hand, in a case where the value Lw/fw becomes lower than the lower limit of inequality (1), the refracting power of each lens unit becomes too strong, and it becomes difficult to correct various aberrations, particularly spherical aberration and astigmatism.

Inequality (2) defines a relationship between the thickness on the optical axis of the second lens unit L2 and the focal length of the second lens unit L2. In a case where the thickness of the second lens unit L2 becomes too large and the value T2421 becomes higher than the upper limit of the inequality (2), the mass of the second lens unit L2 increases, and it becomes difficult to achieve the high-speed zoom operation. On the other hand, in a case where the thickness of the second lens unit L2 becomes too small and the value T2/|f2| becomes lower than the lower limit of the inequality (2), it becomes difficult to suppress the aberrations generated in the second lens unit L2, and to correct various corrections, in particular zoom fluctuations of spherical aberration and astigmatism.

In each example, inequalities (1) and (2) may be replaced with the following inequalities (1a) and (2a), respectively.

$$8.02 < Lw/fw < 12.16 \tag{1a}$$

$$0.38 < T2/f2 < 0.84 \tag{2a}$$

In each example, inequalities (1) and (2) may be replaced with the following inequalities (1b) and (2b), respectively.

$$8.28 < Lw/fw < 10.74 \tag{1b}$$

$$0.47 < T2/f2 < 0.83 \tag{2b}$$

A description will now be given of configurations which the zoom lens according to each example may satisfy.

In each example, the first lens unit L1 may have a lens (first lens) L11 disposed closest to the object and having negative refractive power. Thereby, it becomes easier to suppress the front lens diameter and to facilitate miniaturization. In each example, the rear group LR includes, in order from the object side to the image side, a third lens unit L3 having positive refractive power and a fourth lens unit L4 having positive refractive power. Changing a distance between lens units having positive refractive powers can suppress zoom fluctuations of astigmatism and easily improve optical image quality. Disposing a plurality of lens units having positive refractive powers can reduce the light height of light rays incident on the lens unit disposed closer to the image plane than the fourth lens unit L4 and easily reduce the diameter and size of the lens unit disposed closer to the image plane than the fourth lens unit L4.

In each example, the lens or lens unit disposed closer to the image plane than the fourth lens unit L4 may move during focusing from infinity to a short distance. In a case where a lens unit with a large diameter disposed on the object side is fixed during focusing, and a lens or lens unit with a small diameter disposed on the image side of the fourth lens unit L4 is moved during focusing, the weight of the focus lens unit can be easily reduced, and the driving mechanism can be simplified. Thereby, the miniaturization becomes easy.

In each example, the first lens unit L1 may have at least three lenses having positive refractive powers. Thereby, it becomes easy to achieve both high magnification variation and high performance.

In each example, the second lens unit L2 may include, in order from the object side to the image side, a lens having negative refractive power (second lens disposed closest to the object and having negative refractive power), a lens having negative refractive power, a lens having negative refractive power, and a lens having positive refractive power. Disposing the negative lens on the object side in the second lens unit L2 can easily achieve a wide angle and suppress the diameter of the front lens.

Each example may satisfy at least one of the following inequalities (3) to (15):

$$0.20 < skw/fw < 1.50 \tag{3}$$

$$1.50 < |f1/f2| < 7.70 \tag{4}$$

$$0.60 < M2/fw < 3.20 \tag{5}$$

$$-2.00 < \beta 2t < -0.30 \tag{6}$$

$$0.10 < T1/f1 < 0.70 \tag{7}$$

$$0.40 < |f11/f1| < 2.20 \tag{8}$$

$$-2.00 < (r112 + r111)/(r112 - r111) < -0.20 \tag{9}$$

$$0.10 < MR/ft < 0.50 \tag{10}$$

$$2.00 < f3/fw < 11.00 \tag{11}$$

$$0.70 < f4/fw < 6.70 \tag{12}$$

$$0.40 < (D34w - D34t)/fw < 1.80 \tag{13}$$

$$0.60 < |f21/f2| < 3.00 \tag{14}$$

$$-2.60 < (r212 + r211)/(r212 - r211) < -0.50 \tag{15}$$

Here, skw is a distance (back focus) on the optical axis from a surface vertex position of a surface closest to the image plane in the zoom lens at the wide-angle end to the image plane. f1 is a focal length of the first lens unit L1. f2 is a focal length of the second lens unit L2. M2 is an absolute value of a moving amount of the second lens unit L2 during zooming from the wide-angle end to the telephoto end. β2t is a lateral magnification of the second lens unit L2 at the telephoto end. T1 is a distance on the optical axis from a surface vertex position of a surface closest to the object in the first lens unit L1 to a surface vertex position of a surface closest to the image plane in the first lens unit L1. f11 is a focal length of the lens (first lens) L11. r111 is a radius of curvature of a surface on the object side of the lens L11. r112 is a radius of curvature of a surface on the image side of the lens L11. MR is a maximum absolute value of moving amounts of the lens units in the rear group LR during zooming from the wide-angle end to the telephoto end. ft is a focal length of the zoom lens (entire system) at the telephoto end. f3 is a focal length of the third lens unit L3. f4 is a focal length of the fourth lens unit L4. D34w is a distance on the optical axis from a surface vertex position of a surface closest to the image plane in the third lens unit L3 to a surface vertex position of a surface closest to the object in the fourth lens unit L4 at the wide-angle end. D34t is a distance on the optical axis from the surface vertex position of the surface closest to the image plane in the third lens unit L3 to the surface vertex position of the surface closest to the object in the fourth lens unit L4 at the telephoto end. f21 is a focal length of the lens (second lens) L21. r211 is a radius of curvature of a surface on the object side of the lens L21. r212 is a radius of curvature of a surface on the image side of the lens L21.

Inequality (3) defines a relationship between the back focus at the wide-angle end and the focal length of the zoom lens (entire system). In a case where the back focus becomes too long and the value skw/fw becomes higher than the upper limit of inequality (3), the diameter of the front lens increases, and the zoom lens becomes large. On the other hand, in a case where the back focus becomes too short and the value skw/fw becomes lower than the lower limit of the inequality (3), the lens diameters of the lenses in the rear group LR becomes large, the mass of the lenses in the rear group LR becomes large, high-speed zoom operation becomes difficult.

Inequality (4) defines a relationship between the focal length of the first lens unit L1 and the focal length of the second lens unit L2. In a case where the focal length of the first lens unit L1 becomes too long and the value |f1/f2| becomes higher than the upper limit of the inequality (4), the zoom lens becomes larger. On the other hand, in a case where the focal length of the first lens unit L1 becomes too short and the value |f1/f2| becomes lower than the lower limit of inequality (4), correction of various aberrations, especially spherical aberration and lateral chromatic aberration at the telephoto end, becomes difficult.

Inequality (5) defines a relationship between the moving amount of the second lens unit L2 and the focal length at the wide-angle end. In a case where the moving amount of the second lens unit L2 becomes too large and the value M2/fw becomes higher than the upper limit of the inequality (5), it becomes difficult to achieve high-speed zoom operation. On the other hand, in a case where the moving amount of the second lens unit L2 becomes too small and the value M2/fw becomes lower than the lower limit of the inequality (5), it becomes difficult to achieve high magnification variation.

Inequality (6) defines the lateral magnification of the second lens unit L2 at the telephoto end. In a case where the absolute value of the lateral magnification of the second lens unit L2 at the telephoto end becomes smaller than the upper limit of inequality (6), it is difficult to achieve high magnification variation. On the other hand, in a case where the absolute value of the lateral magnification of the second lens unit L2 becomes larger beyond the lower limit of the inequality (6), the magnification variation share of the second lens unit L2 increases. Thereby, it becomes difficult to correct aberrations occurring in the second lens unit L2, and in particular it becomes difficult to suppress zoom fluctuations of spherical aberration and astigmatism.

Inequality (7) defines a relationship between the thickness and the focal length of the first lens unit L1. In a case where the thickness of the first lens unit L1 becomes too long and the value T1/f1 becomes higher than the upper limit of the inequality (7), the diameter of the front lens increases, and the size of the zoom lens increases. On the other hand, in a case where the thickness of the first lens unit L1 becomes too short and the value T1/f1 becomes lower than the lower limit of the inequality (7), it becomes difficult to correct aberrations occurring in the first lens unit L1, especially spherical aberration and lateral chromatic aberration at the telephoto end.

Inequality (8) defines a relationship between the focal length of the lens L11 and the focal length of the first lens unit L1. In a case where the absolute value of the focal length of the lens L11 becomes too large and the value |f11/f1| becomes higher than the upper limit of the inequality (8), the diameter of the front lens increases. On the other hand, in a case where the absolute value of the focal length of the lens L11 becomes too small and the value |f11/f1| becomes lower than the lower limit of the inequality (8), it becomes difficult to correct aberrations generated by the lens L11, and in particular, it becomes difficult to correct distortion and coma at the wide-angle end.

Inequality (9) defines a relationship between the radius of curvature of the surface on the object side and the radius of curvature of the surface on the image side of the lens L11. In a case where the value (r112+r111)/(r112−r111) becomes higher than the upper limit of inequality (9), it becomes difficult to correct distortion. On the other hand, in a case where the value (r112+r111)/(r112−r111) becomes lower than the lower limit of the inequality (9), the diameter of the front lens increases.

Inequality (10) defines a relationship between the maximum absolute value of moving amounts of the lenses included in the rear group LR and the focal length of the zoom lens (entire system) at the telephoto end. In a case where the maximum absolute value of the moving amounts of the lenses included in the rear group LR becomes larger and the value MR/ft becomes higher than the upper limit of inequality (10), it becomes difficult to achieve high-speed zoom operation. On the other hand, in a case where the maximum absolute value of the moving amounts of the lenses included in the rear group LR becomes smaller and the value MR/ft becomes lower than the lower limit of the inequality (10), it is difficult to increase the magnification variation.

Inequality (11) defines a relationship between the focal length of the third lens unit L3 and the focal length of the zoom lens (entire system) at the wide-angle end. In a case where the focal length of the third lens unit L3 becomes too long and the value f3/fw becomes higher than the upper limit of the inequality (11), the diameter of the lens unit disposed on the image side of the third lens unit L3 increases, and the zoom lens becomes larger. On the other hand, in a case where the focal length of the third lens unit L3 becomes too small and the value f3/fw becomes lower than the lower limit of the inequality (11), it becomes difficult to correct various aberrations generated in the third lens unit L3, and it becomes difficult to correct various aberrations in particular spherical aberration and the longitudinal chromatic aberration at the telephoto end.

Inequality (12) defines a relationship between the focal length of the fourth lens unit L4 and the focal length of the zoom lens (entire system) at the wide-angle end. In a case where the focal length of the fourth lens unit L4 becomes longer and the value f4/fw becomes higher than the upper limit of the inequality (12), the diameter of the lens unit disposed on the image side of the fourth lens unit L4 increases, and the zoom lens becomes larger. On the other hand, in a case where the focal length of the fourth lens unit L4 becomes smaller and the value f4/fw becomes lower than the lower limit of the inequality (12), it becomes difficult to correct various aberrations generated in the fourth lens unit L4, and it becomes difficult to correct various variations in particular spherical aberration and astigmatism at the telephoto end, and coma at the wide-angle end.

Inequality (13) defines a relationship between a distance (air space) between the third lens unit L3 and the fourth lens unit L4 at the wide-angle end and the telephoto end and a focal length of the zoom lens (entire system) at the wide-angle end. In a case where the distance change becomes large and the value (D34w−D34t)/fw becomes higher than the upper limit of the inequality (13), the moving amount of the fourth lens unit L4 becomes too large and it becomes difficult to achieve high-speed zoom operation. On the other hand, in a case where the distance change becomes too small and the value (D34w−D34t)/fw becomes lower than the lower limit of the inequality (13), the zoom fluctuation of the astigmatism becomes large, and it becomes difficult to achieve high image quality.

Inequality (14) defines a relationship between the focal length of the lens L21 and the focal length of the second lens unit L2. In a case where the absolute value of the focal length of the lens L21 becomes too large and the value |f21/f2| becomes higher than the upper limit of the inequality (14), the diameter of the front lens increases, and the zoom lens becomes large. On the other hand, in a case where the absolute value of the focal length of the lens L21 becomes too small and the value |f21/f2| becomes lower than the lower limit of the inequality (14), it becomes difficult to correct various aberrations, especially distortion and lateral chromatic aberration at the wide-angle end.

Inequality (15) defines a relationship between the radius of curvature of the surface on the object side and the radius of curvature of the surface on the image side of lens L21. In a case where the value becomes higher than the upper limit of inequality (15), it becomes difficult to correct distortion. On the other hand, in a case where the value becomes lower than the lower limit of the inequality (15), the diameter of the front lens increases.

In each example, inequalities (3) to (15) may be replaced with the following inequalities (1a) to (15a):

$$0.33 < skw/fw < 1.13 \tag{3a}$$

$$2.25 < |f1/f2| < 5.79 \tag{4a}$$

$$0.90 < M2/fw < 2.41 \tag{5a}$$

$$-1.05 < \beta 2t < -0.60 \tag{6a}$$

$$0.17 < T1/f1 < 0.53 \tag{7a}$$

$$0.60 < |f11/f1| < 1.65 \tag{8a}$$

$$-1.50 < (r112+r111)/(r112-r111) < -0.21 \tag{9a}$$

$$0.17 < MR/ft < 0.38 \tag{10a}$$

$$2.97 < f3/fw < 8.26 \tag{11a}$$

$$1.04 < f4/fw < 5.04 \tag{12a}$$

$$0.58 < (D34w-D34t)/fw < 1.35 \tag{13a}$$

$$0.94 < |f21/f2| < 2.24 \tag{14a}$$

$$-1.49 < (r212+r211)/(r212-r211) < -0.94 \tag{15a}$$

In each example, inequalities (3) to (15) may be replaced with the following inequalities (1b) to (15b):

$$0.40 < skw/fw < 0.95 \tag{3b}$$

$$2.62 < |f1/f2| < 4.83 \tag{4b}$$

$$1.05 < M2/fw < 2.01 \tag{5b}$$

$$-1.00 < \beta 2t < -0.68 \tag{6b}$$

$$0.21 < T1/f1 < 0.44 \tag{7b}$$

$$0.70 < |f11/f1| < 1.37 \tag{8b}$$

$$-0.99 < (r112+r111)/(r112-r111) < -0.22 \tag{9b}$$

$$0.21 < MR/ft < 0.32 \tag{10b}$$

$$3.46 < f3/fw < 6.89 \tag{11b}$$

$$1.21 < f4/fw < 4.21 \tag{12b}$$

$$0.67 < (D34w-D34t)/fw < 1.10 \tag{13b}$$

$$1.11 < |f21/f2| < 1.86 \tag{14b}$$

$$-1.33 < (r212+r211)/(r212-r211) < -0.95 \tag{15b}$$

The configuration of the zoom lens according to each example will be described in detail below.

Example 1

Figure 2A:
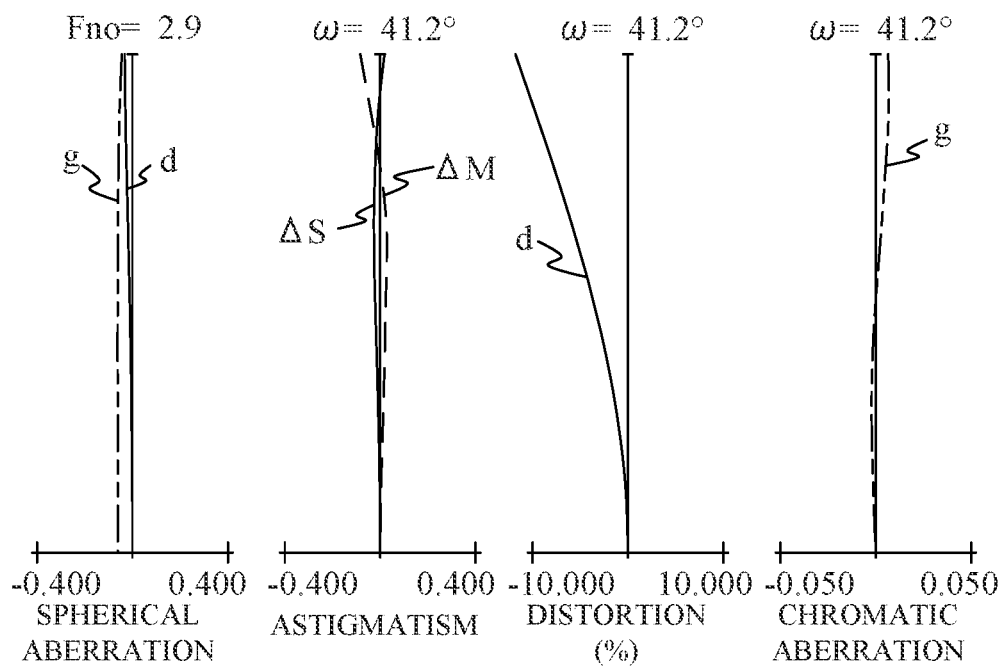
FIGS. 2A and 2B are aberration diagrams of the zoom lens according to Example 1.
Figure 2B:
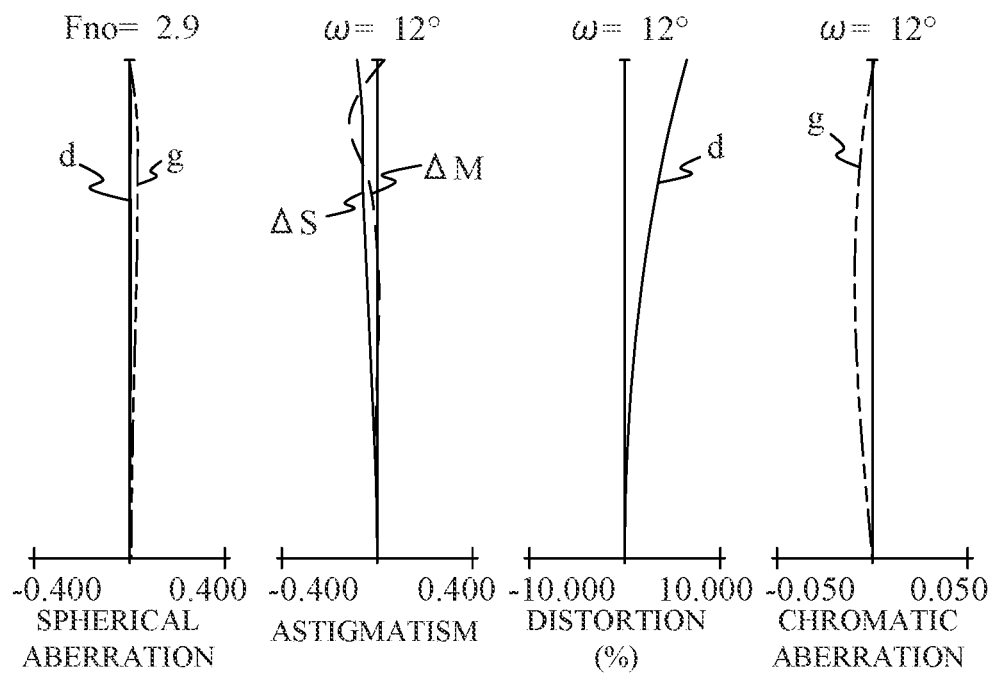

Referring now to FIGS. 1, 2A, and 2B, a description will be given of a zoom lens L0a according to Example 1. FIG. 1 is a sectional view of the zoom lens L0a at the wide-angle end in an in-focus state at infinity. In FIG. 1, a left side is an object side (front), and a right side is an image side (rear side). An aperture stop SP determines (limits) a light beam (luminous flux) of the full aperture (maximum) F-number (Fno). During focusing from an object at infinity to an object at the closest distance (close), the focus lens unit moves as indicated by an arrow "FOCUS" in FIG. 1. In a case where the zoom lens L0a is used as an imaging optical system of a digital still camera or a digital video camera, an image plane IP corresponds to an imaging plane of an image sensor (photoelectric conversion element) such as a charge-coupled device (CCD) sensor or a complementary metal-oxide-semiconductor (CMOS) sensor. In a case where the zoom lens L0a is used as an imaging optical system in a film-based camera, the image plane IP corresponds to the film plane. The above description is the same for other sectional views.

FIG. 2A is an aberration diagram of the zoom lens L0a at the wide-angle end in the in-focus state at infinity, and FIG. 2B is an aberration diagram of the zoom lens L0a at the telephoto end in the in-focus state at infinity. In a spherical aberration diagram, Fno represents an F-number. The spherical aberration diagram illustrates spherical aberration amounts for the d-line (wavelength 587.56 nm) and g-line (wavelength 435.8 nm). In an astigmatism diagram, ΔS indicates an astigmatism amount on a sagittal image plane, and ΔM indicates an astigmatism amount on a meridional image plane. A distortion diagram illustrates a distortion amount for the d-line. A chromatic aberration diagram illustrates a chromatic aberration amount for the g-line. ω is an imaging half angle of view (°) by paraxial calculation. The above description is similarly applied to other aberration diagrams.

The zoom lens L0a according to this example includes, in order from the object side to the image side, a first lens unit L1, a second lens unit L2, and a rear group LR. The rear group LR includes, in order from the object side to the image side, a third lens unit L3 having positive refractive power, a fourth lens unit L4 having positive refractive power, a fifth lens unit L5 having negative refractive power, a sixth lens unit L6 having positive refractive power, and a seventh lens unit L7 having negative refractive power. The first lens unit L1 is fixed relative to the image plane IP during magnification variation (does not move during zooming). Each lens unit moves on a different locus (a locus indicated by an arrow in FIG. 1) while the mutual distances change during magnification variation. The third lens unit L3 has an aperture stop SP. During focusing from infinity to a short distance (close), the fifth lens unit L5 moves toward the object side, and the sixth lens unit L6 moves toward the image side.

Example 2

Figure 3:
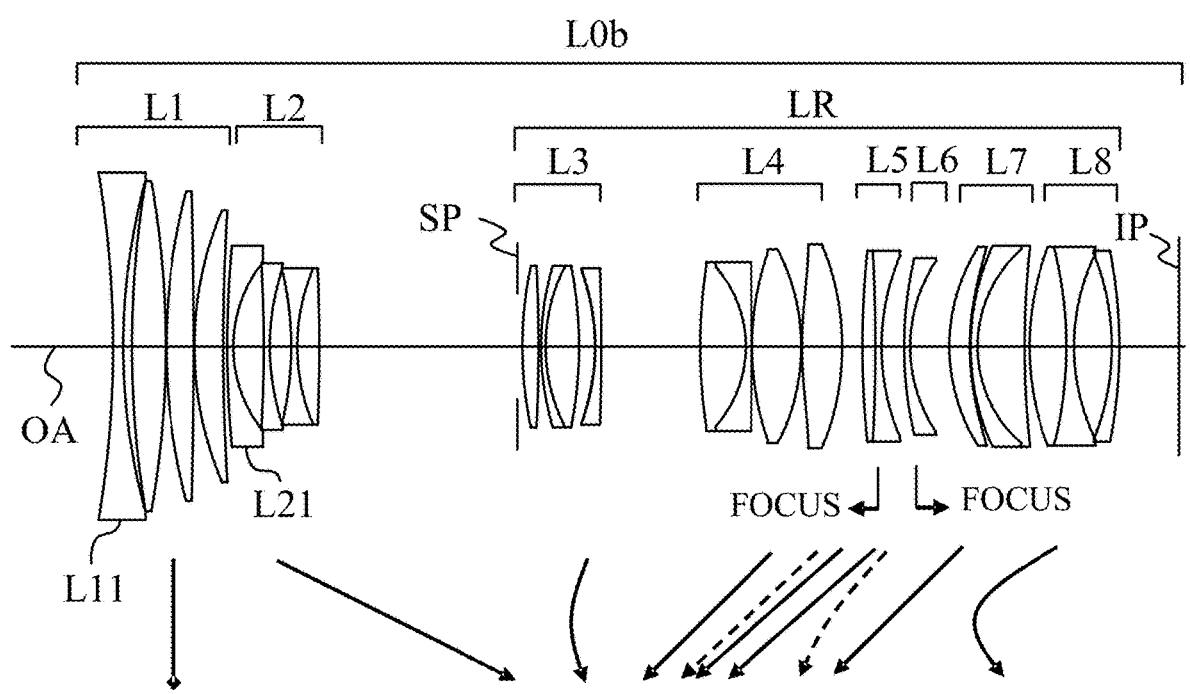
FIG. 3 is a sectional view of a zoom lens according to Example 2.
Figure 4A:
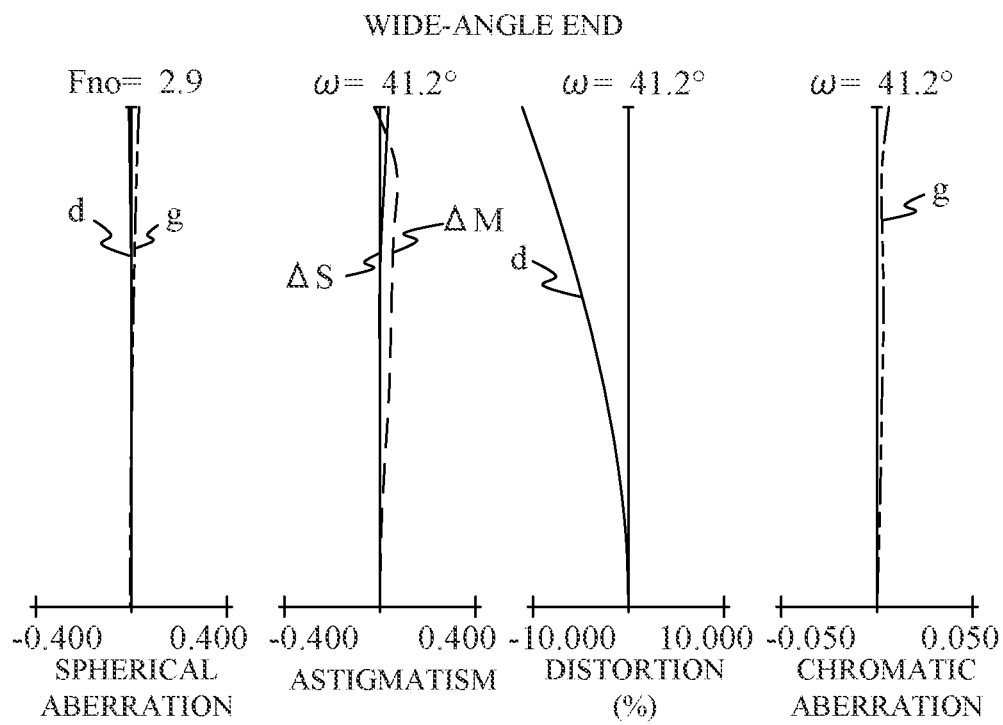
FIGS. 4A and 4B are aberration diagrams of the zoom lens according to Example 2.
Figure 4B:
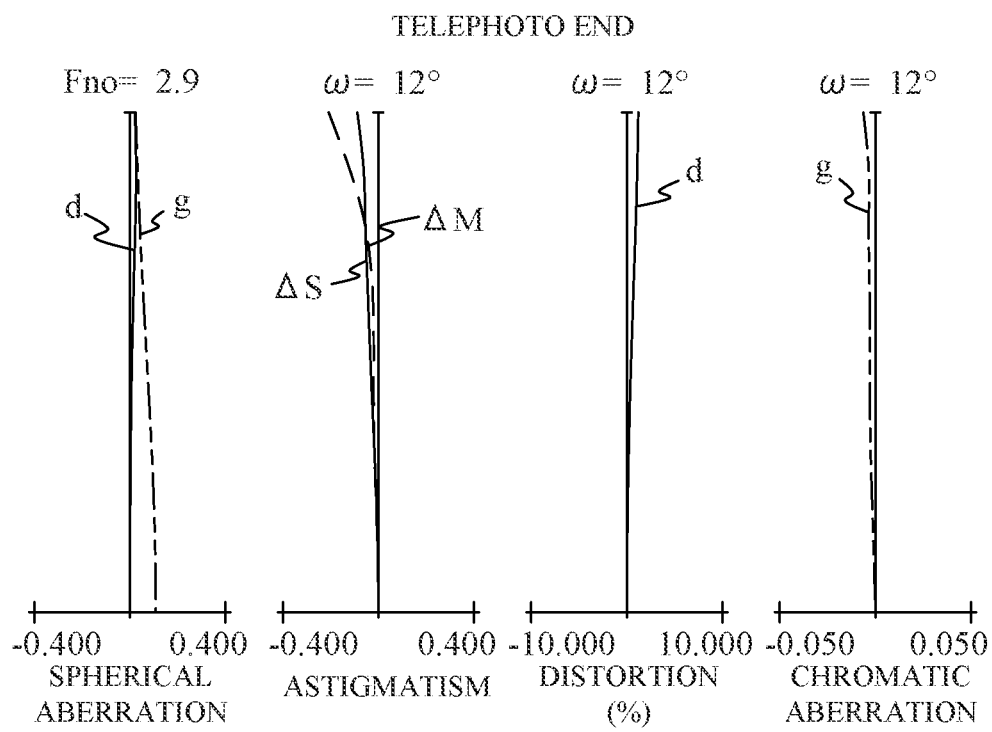

Referring now to FIGS. 3, 4A, and 4B, a description will be given of a zoom lens L0b according to Example 2. FIG. 3 is a sectional view of the zoom lens L0b at the wide-angle end in an in-focus state at infinity. FIG. 4A is an aberration diagram of the zoom lens L0b at the wide-angle end in the in-focus state at infinity, and FIG. 4B is an aberration diagram of the zoom lens L0b at the telephoto end in the in-focus state at infinity.

The zoom lens L0b according to this example includes, in order from the object side to the image side, a first lens unit L1, a second lens unit L2, and a rear group LR. The rear group LR includes, in order from the object side to the image side, a third lens unit L3 having positive refractive power, a fourth lens unit L4 having positive refractive power, a fifth lens unit L5 having negative refractive power, a sixth lens unit L6 having negative refractive power, a seventh lens unit L7 having positive refractive power, and an eighth lens unit L8 having positive refractive power. The first lens unit L1 is fixed relative to the image plane IP during magnification variation (does not move during zooming). Each lens unit moves on a different locus (locus indicated by an arrow in FIG. 3) while the mutual distances change during magnification variation. The third lens unit L3 has an aperture stop SP. During focusing from infinity to a short distance, the fifth lens unit L5 moves toward the object side, and the sixth lens unit L6 moves toward the image side.

Example 3

Figure 5:
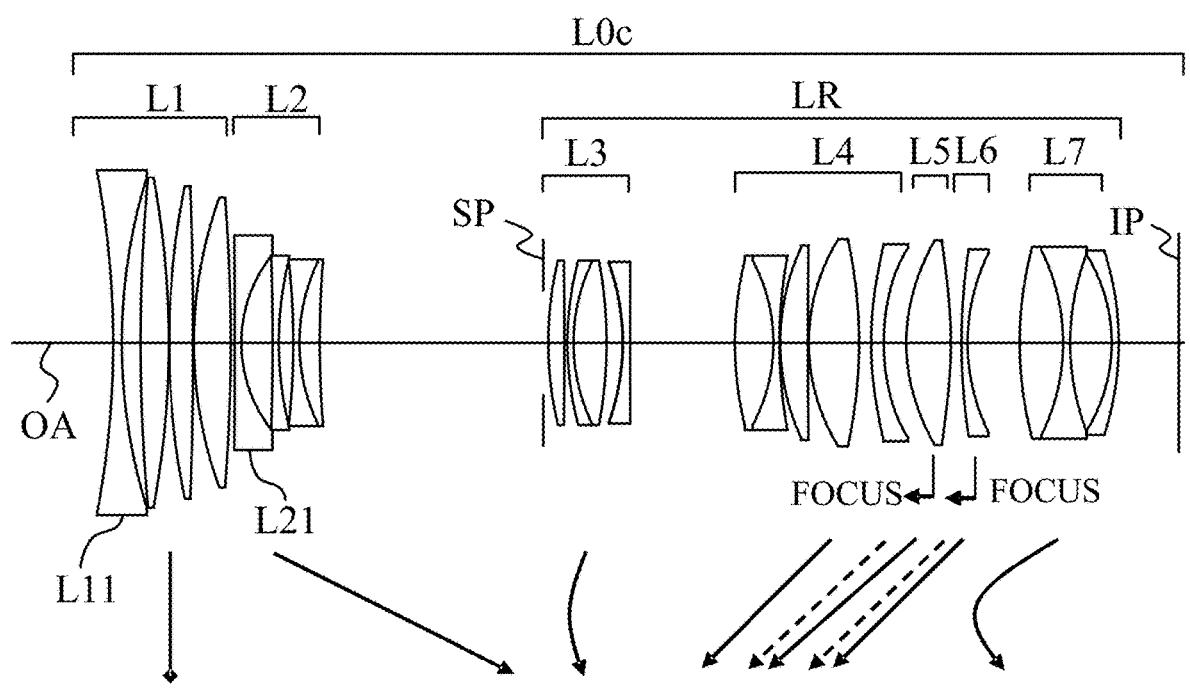
FIG. 5 is a sectional view of a zoom lens according to Example 3.
Figure 6A:
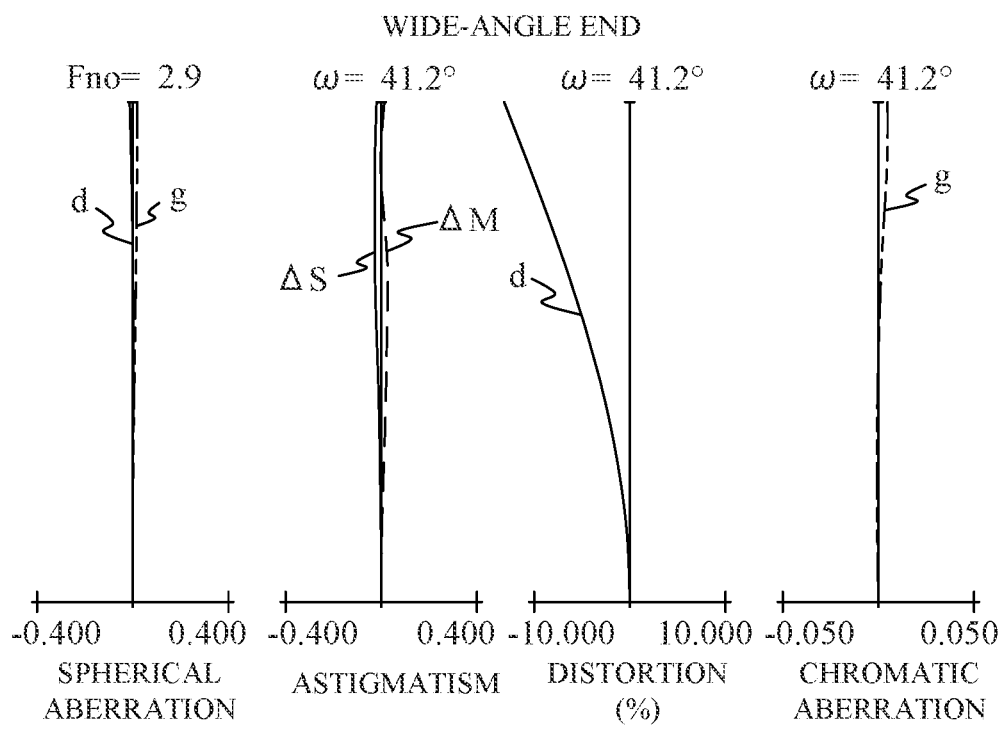
FIGS. 6A and 6B are aberration diagrams of the zoom lens according to Example 3.
Figure 6B:
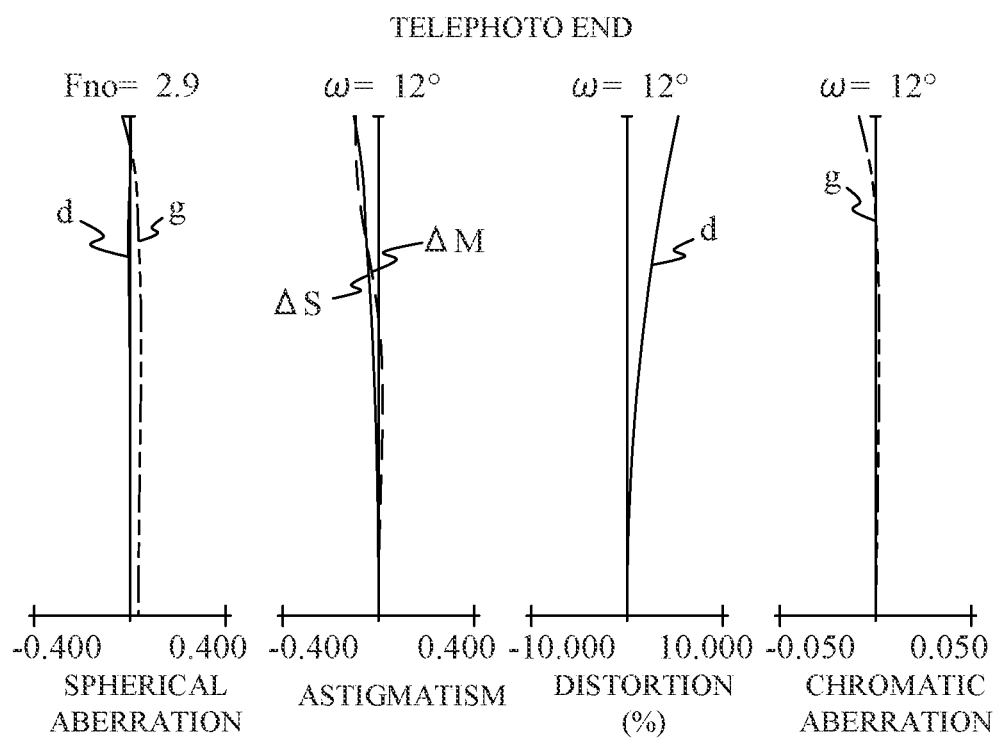

Referring now to FIGS. 5, 6A, and 6B, a description will be given of a zoom lens L0c according to Example 3. FIG. 5 is a sectional view of the zoom lens L0c at the wide-angle end in an in-focus state at infinity. FIG. 6A is an aberration diagram of the zoom lens L0c at the wide-angle end in the in-focus state at infinity, and FIG. 6B is an aberration diagram of the zoom lens L0c at the telephoto end in the in-focus state at infinity.

The zoom lens L0c according to this example includes, in order from the object side to the image side, a first lens unit L1, a second lens unit L2, and a rear group LR. The rear group LR includes, in order from the object side to the image side, a third lens unit L3 having positive refractive power, a fourth lens unit L4 having positive refractive power, a fifth lens unit L5 having positive refractive power, a sixth lens unit L6 having negative refractive power, and a seventh lens unit L7 having negative refractive power. The first lens unit L1 is fixed relative to the image plane IP during magnification variation (does not move during zooming). Each lens unit moves on a different locus (locus indicated by an arrow in FIG. 5) while the mutual distances change during magnification variation. The third lens unit L3 has an aperture stop SP. During focusing from infinity to a short distance, the fifth lens unit L5 moves toward the object side, and the sixth lens unit L6 moves toward the object side.

Example 4

Figure 7:
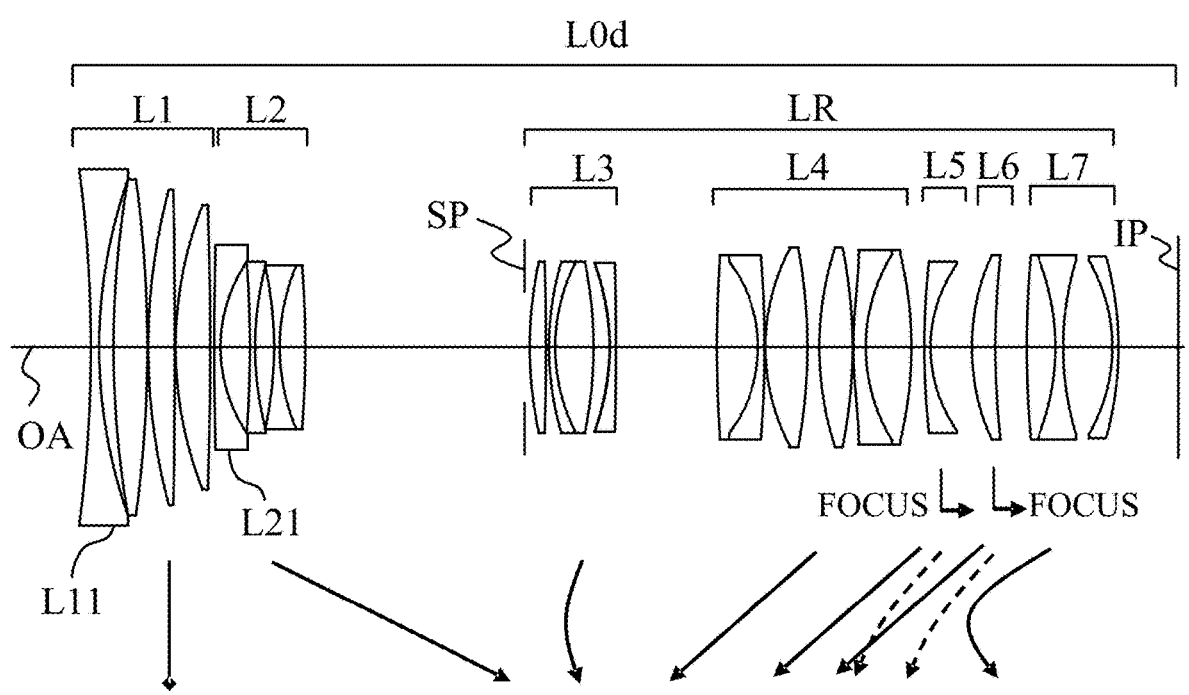
FIG. 7 is a sectional view of a zoom lens according to Example 4.
Figure 8A:
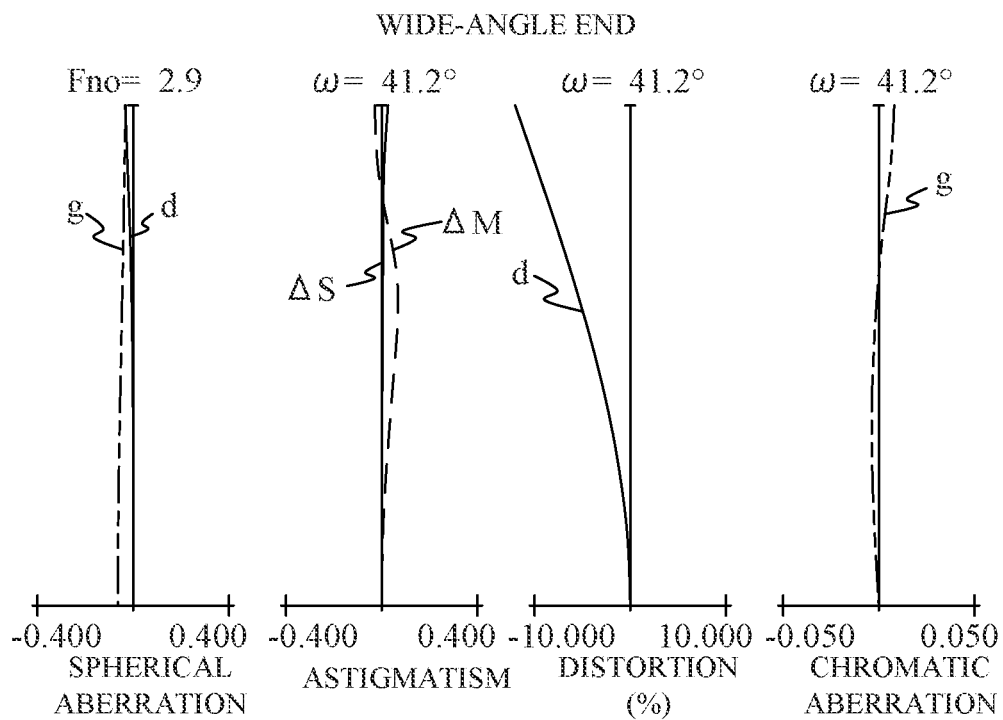
FIGS. 8A and 8B are aberration diagrams of the zoom lens according to Example 4.
Figure 8B:
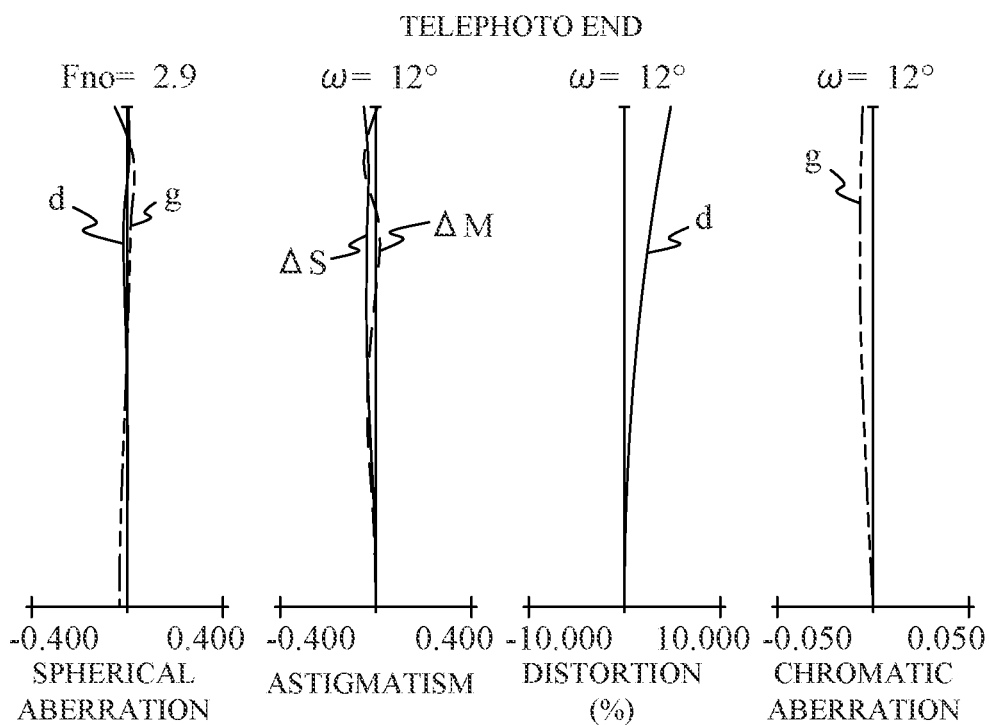

Referring now to FIGS. 7, 8A, and 8B, a description will be given of a zoom lens L0d according to Example 4. FIG. 7 is a sectional view of the zoom lens L0d at the wide-angle end in an in-focus state at infinity. FIG. 8A is an aberration diagram of the zoom lens L0d at the wide-angle end in the in-focus state at infinity, and FIG. 8B is an aberration diagram of the zoom lens L0d at the telephoto end in the in-focus state at infinity.

The zoom lens L0d according to this example includes, in order from the object side to the image side, a first lens unit L1, a second lens unit L2, and a rear group LR. The rear group LR includes, in order from the object side to the image side, a third lens unit L3 having positive refractive power, a fourth lens unit L4 having positive refractive power, a fifth lens unit L5 having negative refractive power, a sixth lens unit L6 having positive refractive power, and a seventh lens unit L7 having negative refractive power. The first lens unit L1 is fixed relative to the image plane IP during magnification variation (does not move during zooming). Each lens unit moves on a different locus (locus indicated by an arrow in FIG. 7) while the mutual distances change during magnification variation. The third lens unit L3 has an aperture stop SP. During focusing from infinity to a short distance, the fifth lens unit L5 moves toward the object side, and the sixth lens unit L6 moves toward the image side.

Example 5

Figure 9:
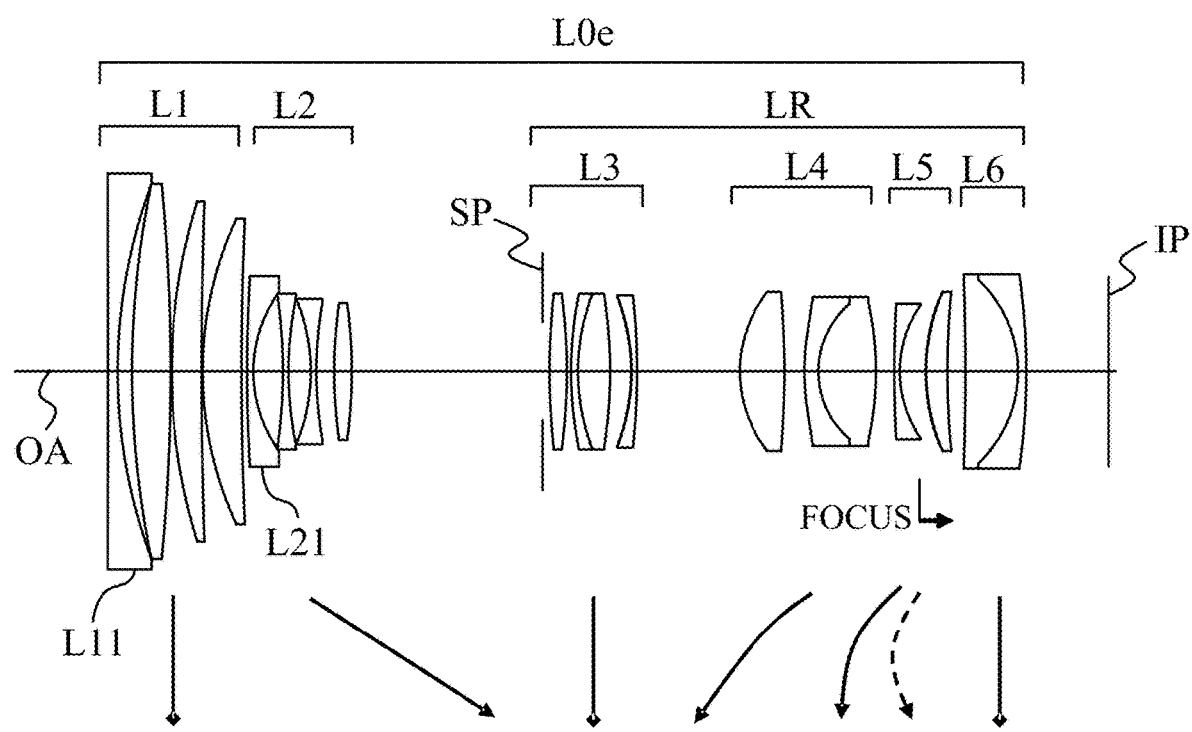
FIG. 9 is a sectional view of a zoom lens according to Example 5.
Figure 10A:
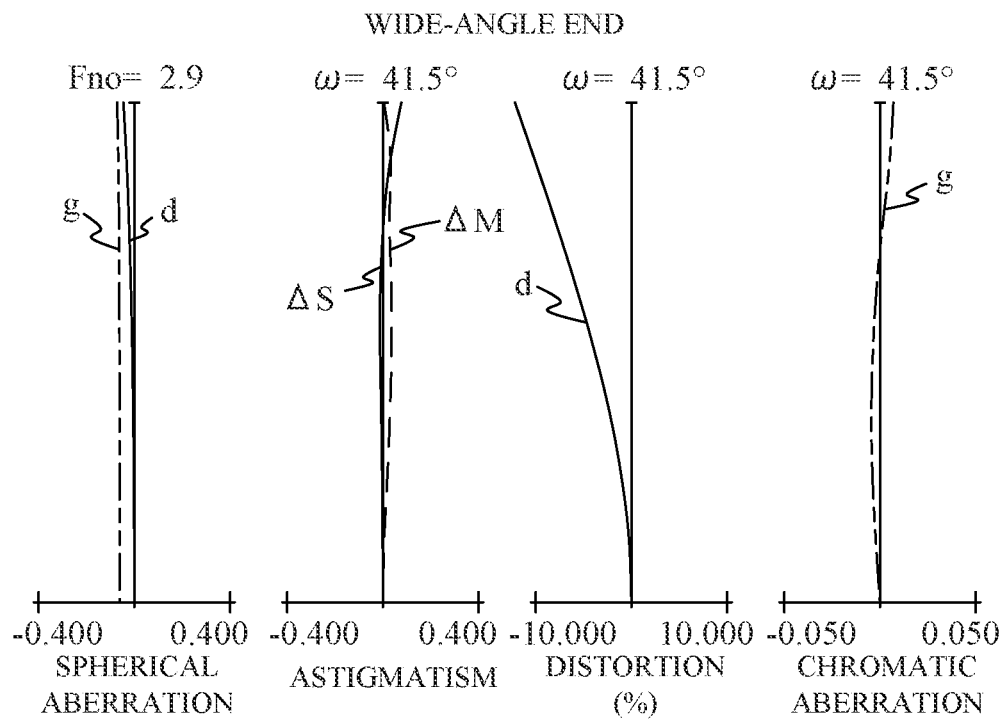
FIGS. 10A and 10B are aberration diagrams of the zoom lens according to Example 5.
Figure 10B:
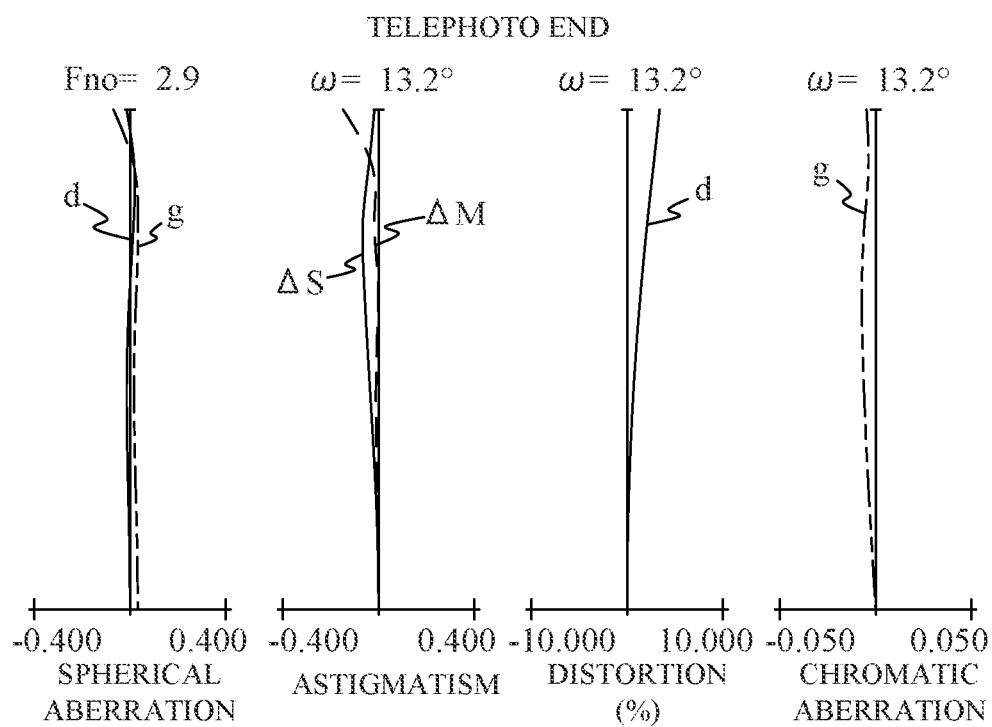

Referring now to FIGS. 9, 10A, and 10B, a description will be given of a zoom lens L0e according to Example 5. FIG. 9 is a sectional view of the zoom lens L0e at the wide-angle end in the in-focus state at infinity. FIG. 10A is an aberration diagram of the zoom lens L0e at the wide-angle end in the in-focus state at infinity, and FIG. 10B is an aberration diagram of the zoom lens L0e at the telephoto end in the in-focus state at infinity.

The zoom lens L0e according to this example includes, in order from the object side to the image side, a first lens unit L1, a second lens unit L2, and a rear group LR. The rear group LR includes, in order from the object side to the image side, a third lens unit L3 having positive refractive power, a fourth lens unit L4 having positive refractive power, a fifth lens unit L5 having negative refractive power, and a sixth lens unit L6 having positive refractive power. The first lens unit L1, the third lens unit L3, and the sixth lens unit L6 are fixed relative to the image plane IP during magnification variation (do not move during zooming). Each lens unit moves on a different locus (locus indicated by an arrow in FIG. 9) while the mutual distances change during magnification variation. The third lens unit L3 has an aperture stop SP. The fifth lens unit L5 moves toward the image side during focusing from infinity to a short distance.

In the zoom lens according to each example, all surfaces having refractive powers include refractive surfaces. The zoom lens according to each example has an optical performance equal to or better than that of a zoom lens in that uses a diffractive optical element and a reflective surface, and less manufacturing difficulty.

In the zoom lens according to each example, image stabilization may be performed by moving a part of the zoom lens in a direction including a component in the direction orthogonal to the optical axis OA. Moving the lens unit on the image side with a relatively small diameter as a part to be moved for image stabilization can make compact a driving actuator and the lens apparatus including the zoom lens. For example, image stabilization may be performed by moving all or part of the third lens unit L3 in the direction including the component in the direction orthogonal to the optical axis OA.

Numerical examples 1 to 5 corresponding to examples 1 to 5 will be illustrated below.

In surface data in each numerical example, r represents a radius of curvature of each optical surface, and d (mm) represents an on-axis distance (distance on the optical axis) between an m-th surface and an (m+1)-th surface, where m is the surface number counted from the light incident side. nd represents a refractive index for the d-line of each optical element, and vd represents an Abbe number of the optical element. The Abbe number vd of a certain material is expressed as follows:

$$vd=(Nd-1)/(NF-NC)$$

where Nd, NF, and NC are refractive indexes based on the d-line (587.6 nm), the F-line (486.1 nm), and the C-line (656.3 nm) in the Fraunhofer line, respectively.

In each numerical example, all values of d, a focal length (mm), an F-number, and half an angle of view (°) are set in a case where the optical system according to each example is in an in-focus state on an infinite object. A back focus BF is a distance on the optical axis from the final lens surface (lens surface closest to the image plane) of the zoom lens to the paraxial image plane, and expressed in air conversion length. An overall lens length of the zoom lens is a length obtained by adding the back focus to the distance on the optical axis from the first lens surface to the final lens surface. The lens unit includes one or more lenses. WIDE, MIDDLE, and TELE mean a wide-angle end (position), an intermediate (middle) zoom position, and a telephoto end (position).

In a case where the optical surface is an aspherical surface, an asterisk * is attached to the right side of the surface number. The aspherical shape is expressed as follows:

$$x=(h^2/R)/[1+\{1-(1+k)(h/R)^2\}^{1/2}]+A4\times h^4+A6\times h^6+A8\times h^8+A10\times h^{10}+A12\times h^{12}$$

where X is a displacement amount from a surface vertex in the optical axis direction, h is a height from the optical axis in a direction orthogonal to the optical axis, a light traveling direction is set positive, R is a paraxial radius of curvature, K is a conic constant, A4, A6, A8, A10, and A12 are aspherical coefficients of respective orders. "e±XX" in the conic constant means "x10±XX."

Numerical Example 1

UNIT: mm
SURFACE DATA

| Surface No | r | d | nd | vd |
|---|---|---|---|---|
| 1 | −207.425 | 1.70 | 1.83481 | 42.7 |
| 2 | 95.825 | 4.21 | | |
| 3 | 393.916 | 2.00 | 1.72047 | 34.7 |
| 4 | 105.832 | 8.46 | 1.59522 | 67.7 |
| 5 | −203.044 | 0.15 | | |
| 6 | 124.562 | 5.68 | 1.72916 | 54.7 |
| 7 | −487.042 | 0.15 | | |
| 8 | 78.249 | 6.74 | 1.72916 | 54.7 |
| 9 | −444.181 | (variable) | | |
| 10 | 8601.520 | 1.20 | 1.80400 | 46.5 |
| 11 | 28.416 | 5.54 | | |
| 12 | −738.337 | 1.00 | 1.49700 | 81.5 |
| 13 | 63.533 | 3.06 | | |
| 14 | −115.610 | 1.00 | 1.49700 | 81.5 |
| 15 | 35.816 | 3.84 | 1.90366 | 31.3 |
| 16 | 169.674 | (variable) | | |
| 17 (aperture stop) | ∞ | 1.00 | | |
| 18 | 67.476 | 3.22 | 1.84666 | 23.8 |
| 19 | −1153.421 | 0.60 | | |
| 20 | 55.893 | 1.20 | 2.00100 | 29.1 |
| 21 | 34.548 | 6.77 | 1.51742 | 52.4 |
| 22 | −82.213 | 3.04 | | |
| 23* | −43.690 | 0.05 | 1.59022 | 30.1 |
| 24 | −46.141 | 1.20 | 1.72916 | 54.7 |
| 25 | 4358.607 | (variable) | | |
| 26 | 172.999 | 7.58 | 1.49700 | 81.5 |
| 27 | −27.250 | 1.19 | 1.83400 | 37.2 |
| 28 | 231.097 | 0.15 | | |
| 29 | 48.103 | 7.69 | 1.48749 | 70.2 |
| 30 | −81.882 | 0.15 | | |
| 31 | 42.435 | 9.37 | 1.43875 | 94.7 |
| 32 | −82.878 | 0.15 | | |
| 33* | 78.425 | 2.40 | 1.85400 | 40.4 |
| 34 | 37.200 | 9.41 | 1.61800 | 63.4 |
| 35 | −70.814 | (variable) | | |
| 36 | 161.341 | 1.20 | 1.77250 | 49.6 |
| 37 | 28.989 | (variable) | | |
| 38* | 48.348 | 3.91 | 1.58313 | 59.4 |
| 39 | 95.150 | (variable) | | |
| 40 | 224.141 | 7.07 | 1.80810 | 22.8 |
| 41 | −35.894 | 1.50 | 1.49700 | 81.5 |
| 42 | 361.709 | 7.03 | | |
| 43 | −34.951 | 1.50 | 1.92286 | 20.9 |
| 44 | −125.011 | (variable) | | |
| image plane | ∞ | | | |

ASPHERICAL DATA

23rd Surface

K = 0.00000e+00 A4 = 3.79285e−06
A6 = −1.22591e−10 A8 = 5.46760e−13

33rd Surface

K = 0.00000e+00 A4 = −7.34648e−06
A6 = −3.52185e−09 A8 = 3.20919e−13

38th Surface

K = 0.00000e+00 A4 = 1.44392e−06
A6 = 4.53989e−09 A8 = −1.13675e−13
A10 = −4.07591e−15

VARIOUS DATA
ZOOM RATIO 4.12

| | WIDE | MIDDLE | TELE |
|---|---|---|---|
| Focal Length | 24.72 | 50.19 | 101.86 |
| Fno | 2.90 | 2.90 | 2.90 |

-continued

| UNIT: mm SURFACE DATA | | | |
|---|---|---|---|
| Half Angle of View | 41.19 | 23.32 | 11.99 |
| Overall Lens Length | 212.40 | 212.40 | 212.40 |
| BF | 11.98 | 26.45 | 21.74 |
| d 9 | 0.80 | 16.04 | 34.02 |
| d16 | 41.01 | 21.11 | 2.98 |
| d25 | 19.68 | 9.87 | 0.79 |
| d35 | 2.80 | 1.19 | 1.18 |
| d37 | 7.64 | 6.92 | 6.23 |
| d39 | 6.39 | 8.72 | 23.36 |
| d44 | 11.98 | 26.45 | 21.74 |

| ZOOM LENS UNIT DATA | | |
|---|---|---|
| Lens Unit | Starting Surface | Focal Length |
| 1 | 1 | 83.05 |
| 2 | 10 | −27.72 |
| 3 | 17 | 106.51 |
| 4 | 26 | 34.04 |
| 5 | 36 | −45.93 |
| 6 | 38 | 163.53 |
| 7 | 40 | −161.55 |

Numerical Example 2

| UNIT: mm SURFACE DATA | | | | |
|---|---|---|---|---|
| Surface No | r | d | nd | vd |
| 1 | −208.117 | 2.00 | 2.00100 | 29.1 |
| 2 | 125.012 | 1.73 | | |
| 3 | 201.666 | 6.72 | 1.59522 | 67.7 |
| 4 | −188.208 | 0.13 | | |
| 5 | 120.220 | 5.48 | 1.83481 | 42.7 |
| 6 | −1189.696 | 0.15 | | |
| 7 | 69.551 | 5.71 | 1.83481 | 42.7 |
| 8 | 436.182 | (variable) | | |
| 9 | 214.024 | 1.20 | 1.90043 | 37.4 |
| 10 | 26.866 | 6.02 | | |
| 11 | −282.246 | 1.20 | 1.59522 | 67.7 |
| 12 | 48.782 | 4.24 | | |
| 13 | −64.715 | 1.20 | 1.49700 | 81.5 |
| 14 | 39.804 | 4.37 | 1.85025 | 30.1 |
| 15 | −376.767 | (variable) | | |
| 16 (aperture stop) | ∞ | 1.00 | | |
| 17 | 76.845 | 3.20 | 1.84666 | 23.8 |
| 18 | −332.575 | 0.50 | | |
| 19 | 56.009 | 0.90 | 2.00100 | 29.1 |
| 20 | 34.921 | 6.63 | 1.51742 | 52.4 |
| 21 | −82.324 | 3.17 | | |
| 22* | −40.899 | 0.05 | 1.59022 | 30.1 |
| 23 | −43.512 | 1.20 | 1.72916 | 54.7 |
| 24 | −438.046 | (variable) | | |
| 25 | 107.656 | 9.03 | 1.49700 | 81.5 |
| 26 | −23.891 | 1.19 | 1.95375 | 32.3 |
| 27 | −1561.807 | 0.15 | | |
| 28 | 57.153 | 9.76 | 1.43875 | 94.7 |
| 29 | −41.965 | 0.15 | | |
| 30* | 84.677 | 7.95 | 1.80400 | 46.5 |
| 31* | −52.890 | (variable) | | |
| 32 | 185.555 | 2.58 | 1.89286 | 20.4 |
| 33 | −333.256 | 1.20 | 1.61800 | 63.4 |
| 34 | 46.156 | (variable) | | |
| 35 | 77.039 | 1.20 | 2.00100 | 29.1 |
| 36 | 30.744 | (variable) | | |
| 37* | 37.408 | 4.07 | 1.58313 | 59.4 |
| 38* | 53.618 | 0.13 | | |
| 39 | 47.870 | 1.39 | 2.00069 | 25.5 |
| 40 | 25.731 | 9.31 | 1.61800 | 63.4 |
| 41 | 176.934 | (variable) | | |
| 42 | 54.577 | 7.41 | 1.84666 | 23.8 |
| 43 | −80.249 | 1.50 | 1.48749 | 70.2 |
| 44 | 42.160 | 7.49 | | |
| 45 | −49.214 | 1.50 | 1.92286 | 20.9 |
| 46 | −97.002 | (variable) | | |
| image plane | ∞ | | | |

ASPHERIC DATA

22nd Surface

K = 0.00000e+00 A4 = 4.39269e−06
A6 = 1.10097e−09 A8 = 6.31456e−13

30th Surface

K = 0.00000e+00 A4 = −5.80494e−06
A6 = −2.08319e−09 A8 = −2.99833e−12

31st Surface

K = 0.00000e+00 A4 = 1.13763e−06
A6 = −3.28114e−09

37th Surface

K = 0.00000e+00 A4 = 2.38842e−06
A6 = −2.70374e−09 A8 = −1.84658e−11
A10 = 2.89507e−14

38th Surface

K = 0.00000e+00 A4 = 6.75134e−08
A6 = −3.59874e−09 A8 = −2.39776e−11
A10 = 3.36099e−14

| VARIOUS DATA ZOOM RATIO 4.13 | | | |
|---|---|---|---|
| | WIDE | MIDDLE | TELE |
| Focal Length | 24.73 | 50.23 | 102.12 |
| Fno | 2.90 | 2.90 | 2.90 |
| Half Angle of View | 41.19 | 23.30 | 11.96 |
| Overall Lens Length | 211.51 | 211.51 | 211.51 |
| BF | 11.80 | 26.61 | 26.29 |
| d 8 | 0.80 | 15.28 | 30.36 |
| d15 | 39.32 | 19.23 | 2.99 |
| d24 | 19.57 | 9.93 | 0.78 |
| d31 | 4.00 | 1.22 | 2.88 |
| d34 | 4.47 | 7.50 | 6.25 |
| d36 | 7.75 | 7.49 | 7.08 |
| d41 | 1.00 | 1.44 | 12.05 |
| d46 | 11.80 | 26.61 | 26.29 |

| ZOOM LENS UNIT DATA | | |
|---|---|---|
| Lens Unit | Starting Surface | Focal Length |
| 1 | 1 | 79.54 |
| 2 | 9 | −24.54 |
| 3 | 16 | 97.60 |
| 4 | 25 | 34.35 |
| 5 | 32 | −131.33 |
| 6 | 35 | −51.78 |
| 7 | 37 | 123.01 |
| 8 | 42 | 770.84 |

Numerical Example 3

| UNIT: mm SURFACE DATA | | | | |
|---|---|---|---|---|
| Surface No | r | d | nd | vd |
| 1 | −181.919 | 1.70 | 1.90043 | 37.4 |
| 2 | 111.072 | 3.71 | | |

-continued

UNIT: mm
SURFACE DATA

| | | | | |
|---|---|---|---|---|
| 3 | 364.499 | 5.59 | 1.59522 | 67.7 |
| 4 | −177.536 | 0.14 | | |
| 5 | 154.743 | 4.78 | 1.75500 | 52.3 |
| 6 | −870.763 | 0.15 | | |
| 7 | 84.502 | 7.28 | 1.75500 | 52.3 |
| 8 | −367.735 | (variable) | | |
| 9 | −2513.905 | 1.30 | 1.72916 | 54.7 |
| 10 | 27.941 | 6.20 | | |
| 11 | −452.183 | 1.20 | 1.59522 | 67.7 |
| 12 | 68.302 | 2.86 | | |
| 13 | −147.630 | 1.20 | 1.49700 | 81.5 |
| 14 | 37.027 | 4.02 | 1.90043 | 37.4 |
| 15 | 197.666 | (variable) | | |
| 16 (aperture stop) | ∞ | 1.00 | | |
| 17 | 70.360 | 3.19 | 1.84666 | 23.8 |
| 18 | −1084.899 | 0.60 | | |
| 19 | 62.970 | 1.20 | 2.05090 | 26.9 |
| 20 | 36.953 | 6.53 | 1.56732 | 42.8 |
| 21 | −87.660 | 3.17 | | |
| 22* | −43.587 | 0.05 | 1.59022 | 30.1 |
| 23 | −46.864 | 1.40 | 1.77250 | 49.6 |
| 24 | 3434.700 | (variable) | | |
| 25 | 68.421 | 7.75 | 1.49700 | 81.5 |
| 26 | −34.337 | 1.19 | 1.83400 | 37.2 |
| 27 | 94.819 | 0.15 | | |
| 28 | 45.071 | 5.49 | 1.49700 | 81.5 |
| 29 | 1775.190 | 0.15 | | |
| 30 | 38.956 | 9.94 | 1.49700 | 81.5 |
| 31 | −94.914 | 2.39 | | |
| 32* | 78.620 | 2.50 | 1.85400 | 40.4 |
| 33* | 49.978 | (variable) | | |
| 34* | 37.006 | 8.81 | 1.58313 | 59.4 |
| 35* | −88.576 | (variable) | | |
| 36 | 123.459 | 1.20 | 2.00100 | 29.1 |
| 37 | 40.182 | (variable) | | |
| 38 | 73.297 | 8.72 | 1.84666 | 23.8 |
| 39 | −41.340 | 1.40 | 1.60311 | 60.6 |
| 40 | 49.128 | 8.20 | | |
| 41 | −33.125 | 1.40 | 1.92286 | 20.9 |
| 42 | −59.144 | (variable) | | |
| image plane | ∞ | | | |

ASPHERIC DATA

22nd Surface

K = 0.00000e+00 A 4 = 3.89058e−06
A 6 = 6.70856e−10 A 8 = −1.58188e−12
32nd Surface K = 0.00000e+00 A 4 = 4.26123e−06
A 6 = −9.76054e−09 A 8 = −4.97564e−12
33rd Surface K = 0.00000e+00 A 4 = 1.08509e−05
A 6 = −5.04108e−09 A 8 = −2.02185e−12
A10 = 5.27144e−15
34th Surface K = 0.00000e+00 A 4 = −1.80819e−06
A 6 = −1.87700e−09 A 8 = 3.87938e−13
35th Surface K = 0.00000e+00 A 4 = 4.45032e−06
A 6 = −4.27576e−09 A 8 = 3.65399e−12

VARIOUS DATA
ZOOM RATIO 4.12

| | WIDE | MIDDLE | TELE |
|---|---|---|---|
| Focal Length | 24.72 | 50.22 | 101.96 |
| Fno | 2.90 | 2.90 | 2.90 |
| Half Angle of View | 41.19 | 23.31 | 11.98 |
| Overall Lens Length | 211.02 | 211.02 | 211.02 |
| BF | 11.85 | 26.68 | 22.74 |

-continued

UNIT: mm
SURFACE DATA

| | | | |
|---|---|---|---|
| d 8 | 0.80 | 16.99 | 35.41 |
| d15 | 44.29 | 21.72 | 3.00 |
| d24 | 20.71 | 11.73 | 0.78 |
| d33 | 4.43 | 7.45 | 8.57 |
| d35 | 2.11 | 1.69 | 3.52 |
| d37 | 10.27 | 8.21 | 20.44 |
| d42 | 11.85 | 26.68 | 22.74 |

ZOOM LENS UNIT DATA

| Lens Unit | Starting Surface | Focal Length |
|---|---|---|
| 1 | 1 | 94.31 |
| 2 | 9 | −29.02 |
| 3 | 16 | 127.17 |
| 4 | 25 | 83.32 |
| 5 | 34 | 45.95 |
| 6 | 36 | −59.94 |
| 7 | 38 | −203.31 |

Numerical Example 4

UNIT: mm
SURFACE DATA

| Surface No | r | d | nd | vd |
|---|---|---|---|---|
| 1 | −266.746 | 1.60 | 1.90043 | 37.4 |
| 2 | 98.340 | 2.81 | | |
| 3 | 192.058 | 6.58 | 1.53775 | 74.7 |
| 4 | −241.263 | 0.15 | | |
| 5 | 119.575 | 5.31 | 1.72916 | 54.7 |
| 6 | −1682.093 | 0.15 | | |
| 7 | 76.157 | 6.72 | 1.72916 | 54.7 |
| 8 | −880.300 | (variable) | | |
| 9 | 915.083 | 1.20 | 1.88300 | 40.8 |
| 10 | 29.841 | 5.73 | | |
| 11 | −218.330 | 1.00 | 1.59522 | 67.7 |
| 12 | 63.389 | 3.69 | | |
| 13 | −74.215 | 1.10 | 1.49700 | 81.5 |
| 14 | 41.057 | 4.98 | 1.77047 | 29.7 |
| 15 | −204.631 | (variable) | | |
| 16 (aperture stop) | ∞ | 1.00 | | |
| 17 | 78.578 | 3.15 | 1.84666 | 23.8 |
| 18 | −594.031 | 0.60 | | |
| 19 | 59.615 | 1.20 | 2.00100 | 29.1 |
| 20 | 36.734 | 7.47 | 1.51742 | 52.4 |
| 21 | −83.322 | 3.11 | | |
| 22* | −44.261 | 0.05 | 1.59022 | 30.1 |
| 23 | −47.091 | 1.20 | 1.77250 | 49.6 |
| 24 | −640.625 | (variable) | | |
| 25 | 255.634 | 8.10 | 1.49700 | 81.5 |
| 26 | −27.474 | 1.30 | 1.90043 | 37.4 |
| 27 | −222.061 | 0.15 | | |
| 28 | 41.537 | 8.18 | 1.49700 | 81.5 |
| 29 | −105.932 | 2.30 | | |
| 30 | 63.231 | 6.49 | 1.49700 | 81.5 |
| 31 | −97.379 | 0.15 | | |
| 32* | 85.354 | 2.40 | 1.85400 | 40.4 |
| 33 | 34.925 | 8.89 | 1.60311 | 60.6 |
| 34 | −78.017 | (variable) | | |
| 35 | 157.315 | 1.20 | 1.72916 | 54.7 |
| 36 | 28.256 | (variable) | | |
| 37* | 47.159 | 4.54 | 1.58313 | 59.4 |
| 38 | 160.935 | (variable) | | |
| 39 | 210.344 | 5.69 | 1.80518 | 25.4 |
| 40 | −46.896 | 1.50 | 1.48749 | 70.2 |
| 41 | 59.110 | 9.57 | | |
| 42 | −33.883 | 1.20 | 2.00069 | 25.5 |
| 43 | −66.006 | (variable) | | |
| image plane | ∞ | | | |

-continued

UNIT: mm
SURFACE DATA

ASPHERIC DATA

22nd Surface

K = 0.00000e+00 A4 = 3.72124e−06
A6 = 3.39835e−10 A8 = 6.96887e−13
32nd Surface

K = 0.00000e+00 A4 = −7.10364e−06
A6 = −3.27713e−09 A8 = −1.38031e−12
37th Surface K = 0.00000e+00 A4 = 1.68172e−06
A6 = 3.21879e−09 A8 = 5.86323e−12
A10 = −1.26470e−14

VARIOUS DATA
ZOOM RATIO 4.12

|  | WIDE | MIDDLE | TELE |
|---|---|---|---|
| Focal Length | 24.78 | 50.31 | 102.06 |
| Fno | 2.90 | 2.90 | 2.90 |
| Half Angle of View | 41.12 | 23.27 | 11.97 |
| Overall Lens Length | 211.98 | 211.98 | 211.98 |
| BF | 11.63 | 25.76 | 19.01 |
| d 8 | 0.80 | 16.58 | 34.70 |
| d15 | 42.76 | 21.90 | 2.98 |
| d24 | 19.63 | 10.61 | 0.79 |
| d34 | 2.50 | 1.78 | 1.10 |
| d36 | 8.07 | 7.90 | 7.19 |
| d38 | 6.12 | 7.00 | 25.75 |
| d43 | 11.63 | 25.76 | 19.01 |

ZOOM LENS UNIT DATA

| Lens Unit | Starting Surface | Focal Length |
|---|---|---|
| 1 | 1 | 90.57 |
| 2 | 9 | −27.00 |
| 3 | 16 | 119.23 |
| 4 | 25 | 35.02 |
| 5 | 35 | −47.42 |
| 6 | 37 | 112.74 |
| 7 | 39 | −90.78 |

Numerical Example 5

UNIT: mm
SURFACE DATA

| Surface No | r | d | nd | vd |
|---|---|---|---|---|
| 1 | −8741.959 | 1.40 | 2.00100 | 29.1 |
| 2 | 77.425 | 2.07 |  |  |
| 3 | 132.828 | 5.55 | 1.48749 | 70.2 |
| 4 | −278.544 | 0.15 |  |  |
| 5 | 81.695 | 4.36 | 1.72916 | 54.7 |
| 6 | 698.842 | 0.15 |  |  |
| 7 | 52.270 | 5.59 | 1.72916 | 54.7 |
| 8 | 496.392 | (variable) |  |  |
| 9 | 231.928 | 0.90 | 1.80400 | 46.6 |
| 10 | 19.761 | 4.24 |  |  |
| 11 | −78.088 | 0.80 | 1.59282 | 68.6 |
| 12 | 53.314 | 3.20 |  |  |
| 13 | −27.410 | 0.80 | 1.49700 | 81.5 |
| 14 | 57.444 | 2.55 |  |  |
| 15 | 69.921 | 2.53 | 1.85025 | 30.1 |
| 16 | −72.259 | (variable) |  |  |
| 17 (aperture stop) | ∞ | 1.00 |  |  |
| 18 | 104.572 | 2.48 | 1.84666 | 23.8 |
| 19 | −84.594 | 0.60 |  |  |

-continued

UNIT: mm
SURFACE DATA

| 20 | 55.992 | 1.00 | 1.90043 | 37.4 |
|---|---|---|---|---|
| 21 | 31.491 | 4.61 | 1.49700 | 81.5 |
| 22 | −70.253 | 3.02 |  |  |
| 23* | −28.727 | 0.05 | 1.59022 | 30.1 |
| 24 | −29.778 | 0.80 | 1.80518 | 25.4 |
| 25 | −100.170 | (variable) |  |  |
| 26 | 18.384 | 6.47 | 1.49700 | 81.5 |
| 27 | −138.084 | 2.89 |  |  |
| 28* | 35.239 | 2.00 | 1.85400 | 40.4 |
| 29 | 12.971 | 8.26 | 1.53775 | 74.7 |
| 30 | −46.153 | (variable) |  |  |
| 31 | 168.469 | 0.80 | 1.69680 | 55.5 |
| 32 | 16.983 | 3.73 |  |  |
| 33* | 31.760 | 0.05 | 1.59022 | 30.1 |
| 34 | 29.014 | 3.06 | 1.59551 | 39.2 |
| 35 | 123.379 | (variable) |  |  |
| 36 | −344.548 | 7.53 | 1.90366 | 31.3 |
| 37 | −18.233 | 1.20 | 1.84666 | 23.8 |
| 38 | −96.734 | (variable) |  |  |
| image plane | ∞ |  |  |  |

ASPHERIC DATA

23rd Surface

K = 0.00000e+00 A4 = 8.09779e−06
A6 = −1.18636e−08 A8 = 6.70206e−11
28th Surface K = 0.00000e+00 A4 = −2.83986e−05
A6 = −4.36898e−08 A8 = −1.47706e−10
33rd Surface K = 0.00000e+00 A4 = 7.39408e−06
A6 = 5.64098e−08 A8 = 1.50619e−10
A10 = −4.36865e−13

VARIOUS DATA
ZOOM RATIO 3.77

|  | WIDE | MIDDLE | TELE |
|---|---|---|---|
| Focal Length | 15.45 | 30.00 | 58.20 |
| Fno | 2.90 | 2.90 | 2.90 |
| Half Angle of View | 41.48 | 24.48 | 13.21 |
| Overall Lens Length | 143.99 | 143.99 | 143.99 |
| BF | 11.90 | 11.90 | 11.90 |
| d 8 | 0.80 | 12.86 | 25.80 |
| d16 | 27.48 | 15.42 | 2.48 |
| d25 | 14.75 | 4.45 | 0.78 |
| d30 | 2.62 | 1.54 | 5.64 |
| d35 | 2.60 | 13.97 | 13.54 |
| d38 | 11.90 | 11.90 | 11.90 |

ZOOM LENS UNIT DATA

| Lens Unit | Starting Surface | Focal Length |
|---|---|---|
| 1 | 1 | 70.23 |
| 2 | 9 | −18.13 |
| 3 | 17 | 85.18 |
| 4 | 26 | 26.26 |
| 5 | 31 | −47.32 |
| 6 | 36 | 106.66 |

TABLE 1 below summarizes values corresponding to inequalities (1) to (15) of each example (EX):

TABLE 1

|  | EX 1 | EX 2 | EX 3 | EX 4 | EX 5 |
|---|---|---|---|---|---|
| Lw/fw | 8.590 | 8.554 | 8.536 | 8.553 | 9.318 |
| T2/f2 | 0.564 | 0.743 | 0.578 | 0.656 | 0.829 |
| skw/fw | 0.485 | 0.477 | 0.479 | 0.469 | 0.770 |

TABLE 1-continued

|  | EX 1 | EX 2 | EX 3 | EX 4 | EX 5 |
|---|---|---|---|---|---|
| \|f1/f2\| | 2.996 | 3.241 | 3.249 | 3.355 | 3.874 |
| M2/fw | 1.344 | 1.195 | 1.400 | 1.368 | 1.618 |
| β2t | −0.990 | −0.996 | −0.852 | −0.853 | −0.691 |
| T1/f1 | 0.350 | 0.276 | 0.248 | 0.257 | 0.274 |
| \|f11/f1\| | 0.943 | 0.978 | 0.810 | 0.879 | 1.092 |
| (r112 + r111)/(r112 − r111) | −0.368 | −0.249 | −0.242 | −0.461 | −0.982 |
| MR/ft | 0.262 | 0.261 | 0.261 | 0.265 | 0.240 |
| f3/fw | 4.308 | 3.947 | 5.145 | 4.811 | 5.512 |
| f4/fw | 1.377 | 1.389 | 3.371 | 1.413 | 1.699 |
| (D34w − D34t)/fw | 0.764 | 0.760 | 0.806 | 0.760 | 0.904 |
| \|f21/f2\| | 1.279 | 1.395 | 1.305 | 1.295 | 1.485 |
| (r212 + r211)/(r212 − r211) | −1.007 | −1.287 | −0.978 | −1.067 | −1.186 |

Image Pickup Apparatus

Figure 11:
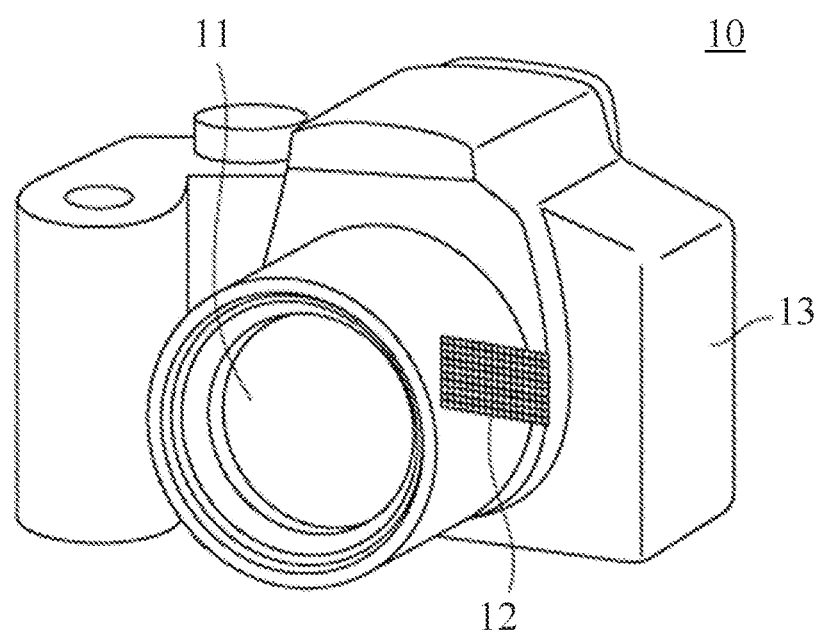
FIG. 11 is a schematic diagram of an image pickup apparatus having a zoom lens according to any one of examples.

Referring now to FIG. 11, a description will be given of an image pickup apparatus (digital still camera) 10 having a zoom lens according to any one of the above examples. FIG. 11 is a schematic diagram of the image pickup apparatus 10. The image pickup apparatus 10 includes a camera body 13, a lens apparatus 11 including the zoom lens (L0a to L0e) according to any one of Examples 1 to 5, and an image sensor (light receiving element) 12 configured to photoelectrically convert an image formed by the zoom lens. The image sensor 12 is a photoelectric conversion element such as a CCD sensor or CMOS sensor. The lens apparatus 11 and the camera body 13 may be integrated with each other, or may be attachable to and detachable from each other. The image pickup apparatus 10 can realize a small size and reduced weight and high optical performance. The zoom lens according to each example is not limited to the image pickup apparatus 10 illustrated in FIG. 11, but is applicable to various image pickup apparatuses such as a broadcasting camera, a film-based camera, a surveillance cameras, and the like.

Each example can provide a zoom lens and an image pickup apparatus, each of which has a compact size, a high magnification variation ratio, and a large aperture ratio, and can achieve high image quality and high-speed zoom operation.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-128262, filed on Aug. 10, 2022, which is hereby incorporated by reference herein in its entirety.

What is claimed is:

1. A zoom lens comprising, in order from an object side to an image side, a first lens unit having positive refractive power, a second lens unit having negative refractive power, and a rear group including at least four lens units that move during zooming,
    wherein distances between adjacent lens units change during zooming,
    wherein the first lens unit is fixed relative to an image plane during zooming and during focusing,
    wherein the first lens unit includes at least three lenses having positive refractive powers, and
    wherein the following inequalities are satisfied:

$7.50 < Lw/fw < 15.00$ $0.20 < T2/|f2| < 0.85$ $0.20 < skw/fw < 1.13$ $-2.00 < β2t < -0.30$ where Lw is a distance on an optical axis from a surface vertex position of a surface closest to an object in the zoom lens at a wide-angle end to the image plane, fw is a focal length of the zoom lens at the wide-angle end, T2 is a distance on the optical axis from a surface vertex position of a surface closest to the object of the second lens unit to a surface vertex position of a surface closest to the image plane of the second lens unit, and f2 is a focal length of the second lens unit, skw is a distance on the optical axis from a surface vertex position of a surface closest to the image plane of the zoom lens to the image plane at the wide-angle end, and β2t is a lateral magnification of the second lens unit at a telephoto end.

2. The zoom lens according to claim 1, wherein the following inequality is satisfied:

$1.50 < |f1/f2| < 7.70$ where f1 is a focal length of the first lens unit, and f2 is a focal length of the second lens unit.

3. The zoom lens according to claim 1, wherein the following inequality is satisfied:

$0.60 < M2/fw < 3.20$ where M2 is an absolute value of a moving amount of the second lens unit during zooming from the wide-angle end to a telephoto end.

4. The zoom lens according to claim 1, wherein the following inequality is satisfied:

$0.10 < T1/f1 < 0.70$ where f1 is a focal length of the first lens unit, and T1 is a distance on the optical axis from a surface vertex position of a surface closest to the object of the first lens unit to a surface vertex position of a surface closest to the image plane of the first lens unit.

5. The zoom lens according to claim 1, wherein the first lens unit includes a first lens disposed closest to the object and having negative refractive power.

6. The zoom lens according to claim 5, wherein the following inequality is satisfied:

$0.40 < |f11/f1| < 2.20$ where f1 is a focal length of the first lens unit, and f11 is a focal length of the first lens.

7. The zoom lens according to claim 5, wherein the following inequality is satisfied:

$-2.00 < (r112+r111)/(r112-r111) < -0.20$ where r111 is a radius of curvature of a surface on the object side of the first lens, and r112 is a radius of curvature of a surface on the image side of the first lens.

8. The zoom lens according to claim 1, wherein the following inequality is satisfied:

$0.10 < MR/ft < 0.50$ where MR is a maximum absolute value of moving amounts of the lens units included in the rear group during zooming from the wide-angle end to a telephoto end, and ft is a focal length of the zoom lens at the telephoto end.

9. The zoom lens according to claim 1, wherein the rear group includes, in order from the object side to the image side, a third lens unit having positive refractive power, and a fourth lens unit having positive refractive power.

10. The zoom lens according to claim 9, wherein the following inequality is satisfied:

$$2.00 < f3/fw < 11.00$$

where f3 is a focal length of the third lens unit.

11. The zoom lens according to claim 9, wherein the following inequality is satisfied:

$$0.70 < f4/fw < 6.70$$

where f4 is a focal length of the fourth lens unit.

12. The zoom lens according to claim 9, wherein the following inequality is satisfied:

$$0.40 < (D34w - D34t)/fw < 1.80$$

where D34w is a distance on the optical axis from a surface vertex position of a surface closest to the image plane in the third lens unit to a surface vertex position of a surface closest to the object in the fourth lens unit at the wide-angle end, and D34t is a distance on the optical axis from the surface vertex position of the surface closest to the image plane in the third lens unit to the surface vertex position of the surface closest to the object in the fourth lens unit at a telephoto end.

13. The zoom lens according to claim 9, wherein only a lens unit disposed on the image side of the fourth lens unit moves during focusing.

14. The zoom lens according to claim 1, wherein the second lens unit includes a second lens disposed closest to the object and having negative refractive power.

15. The zoom lens according to claim 14, wherein the following inequality is satisfied:

$$0.60 < |f21/f2| < 3.00$$

where f21 is a focal length of the second lens.

16. The zoom lens according to claim 14, wherein the following inequality is satisfied:

$$-2.60 < (r212 + r211)/(r212 - r211) < -0.50$$

where r211 is a radius of curvature of a surface on the object side of the second lens, and r212 is a radius of curvature of a surface on the image side of the second lens.

17. The zoom lens according to claim 1, wherein the second lens unit includes, in order from the object side to the image side, a lens having negative refractive power, a lens having negative refractive power, a lens having negative refractive power, and a lens having positive refractive power.

18. An image pickup apparatus comprising:
the zoom lens according to claim 1; and
an image sensor configured to receive an image formed by the zoom lens.

* * * * *